(12) United States Patent
Sathish et al.

(10) Patent No.: US 10,489,470 B2
(45) Date of Patent: Nov. 26, 2019

(54) METHOD AND SYSTEM FOR FILTERING CONTENT IN AN ELECTRONIC DEVICE

(71) Applicant: Samsung Electronics Co., Ltd., Suwon-si, Gyeonggi-do (KR)

(72) Inventors: Sailesh Kumar Sathish, Bangalore (IN); Nirmesh Neema, Indore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 15/058,774

(22) Filed: Mar. 2, 2016

(65) Prior Publication Data

US 2016/0259859 A1    Sep. 8, 2016

(30) Foreign Application Priority Data

Mar. 3, 2015 (IN) .......................... 1026/CHE/2015
Feb. 25, 2016 (KR) ....................... 10-2016-0022373

(51) Int. Cl.
*G06F 16/9535* (2019.01)
*G06F 16/335* (2019.01)
*G06F 16/35* (2019.01)

(52) U.S. Cl.
CPC ........ *G06F 16/9535* (2019.01); *G06F 16/335* (2019.01); *G06F 16/355* (2019.01)

(58) Field of Classification Search
None
See application file for complete search history.

(56) References Cited

U.S. PATENT DOCUMENTS

| 8,423,538 | B1* | 4/2013 | Sadikov | G06F 17/30463 |
| | | | | 707/706 |
| 9,558,267 | B2* | 1/2017 | Dasgupta | G06F 17/30707 |
| 2005/0240580 | A1* | 10/2005 | Zamir | G06F 17/30867 |
| 2007/0043706 | A1 | 2/2007 | Burke et al. | |
| 2007/0156677 | A1 | 7/2007 | Szabo | |
| 2008/0205774 | A1 | 8/2008 | Brinker et al. | |
| 2008/0256443 | A1 | 10/2008 | Li et al. | |
| 2009/0070309 | A1 | 3/2009 | Gajda et al. | |
| 2009/0164452 | A1* | 6/2009 | Yogaratnam | G06F 16/9535 |
| 2010/0169300 | A1* | 7/2010 | Liu | G06F 17/30864 |
| | | | | 707/709 |
| 2010/0198812 | A1* | 8/2010 | Athsani | H04W 4/029 |
| | | | | 707/722 |
| 2012/0102044 | A1 | 4/2012 | Ott, IV et al. | |

(Continued)

FOREIGN PATENT DOCUMENTS

EP     2 034 418 A1    3/2009
KR   10-2014-0090114 A   7/2014
WO    2011/087909 A2    7/2011

*Primary Examiner* — Richard L Bowen
(74) *Attorney, Agent, or Firm* — Jefferson IP Law, LLP

(57) ABSTRACT

An electronic device is provided. The electronic device includes a display, a communication circuit, and a processor electrically connected with the display and the communication circuit. The processor may be configured to display at least one data cluster containing user intent information on the display, select a data cluster to be applied to an application among the at least one data cluster according to a user input, filter at least one content or service among content and services available in the application on the basis of the selected data cluster, and display an item corresponding to the at least one filtered content or service on the display.

17 Claims, 19 Drawing Sheets

Weightage applied for Filter

- User vector
  'Beckam',0.0066 'england',0.00503, 'ManU',0.00484, 'win',0.0044, 'season',0.0043

- Ad-Words
  'Arm-Band',0.00032 'england',0.00268, 'Nike',0.0004, 'Chelsea Band',0.0024, 'schedule magnet',0.0026

- Contextual-Index
  Vector: ManU, BundesLiga, Bayern,
  FIFA Context: GMT+3.00, location: "Home"

Topic Vector

Ad-Words      Contextual Indexed Vectors

(56) References Cited

U.S. PATENT DOCUMENTS

| | | | |
|---|---|---|---|
| 2012/0109778 A1 | 5/2012 | Chan et al. | |
| 2012/0110463 A1* | 5/2012 | Brolley | G06Q 30/0282 715/738 |
| 2012/0209839 A1* | 8/2012 | Andrews | G06Q 10/10 707/728 |
| 2012/0290575 A1* | 11/2012 | Hu | G06F 17/30646 707/737 |
| 2013/0117046 A1 | 5/2013 | Chaudhri et al. | |
| 2013/0166525 A1* | 6/2013 | Naranjo | G06F 17/30864 707/706 |
| 2013/0173637 A1* | 7/2013 | Kim | G06Q 30/02 707/748 |
| 2013/0218667 A1* | 8/2013 | Mohamed | G06Q 30/02 705/14.45 |
| 2015/0058744 A1* | 2/2015 | Dhingra | G06F 9/451 715/747 |
| 2017/0213243 A1* | 7/2017 | Dollard | G06Q 30/0249 |

* cited by examiner

METHOD AND SYSTEM FOR FILTERING CONTENT IN AN ELECTRONIC DEVICE

CROSS-REFERENCE TO RELATED APPLICATION(S)

This application claims the benefit under 35 U.S.C. § 119(a) of an Indian Provisional patent application filed on Mar. 3, 2015 in the Indian Patent Office and assigned Serial number 1026/CHE/2015, of an Indian patent application filed on Sep. 2, 2015 in the Indian Patent Office and assigned Serial number 1026/CHE/2015, and of a Korean patent application filed on Feb. 25, 2016 in the Korean Intellectual Property Office and assigned Serial number 10-2016-0022373, the entire disclosure of each of which is hereby incorporated by reference.

TECHNICAL FIELD

The present disclosure relates to electronic devices. More particularly, the present disclosure relates to a mechanism for filtering content in an electronic device based on user intent.

BACKGROUND

With the proliferation of applications in an electronic device connected to the Internet, and with the growth of content on the Internet, people are more often searching for appropriate content on the Internet on a regular basis. To do so, search engines provide technologies that enable users to search for information on the world wide web (WWW), and other information databases. The information retrieval during a search largely depends on whether a user submits effective queries to the search engine to cause the search engine to retrieve results relevant to the intent of the user.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages, and to provide at least the advantages described below. Accordingly, an aspect of the present disclosure is to provide a mechanism for filtering content in an electronic device based on user intent.

Another aspect of the present disclosure is to provide a mechanism for receiving a data cluster as an input to filter content available in an application.

Another aspect of the present disclosure is to provide a mechanism for filtering the content available in the application to identify at least one item for the received data cluster.

Another aspect of the present disclosure is to provide a mechanism for displaying the identified at least one item on the electronic device.

Another aspect of the present disclosure is to provide a mechanism for dynamically changing the data of the data cluster based on a parameter associated with the user intent.

In accordance with an aspect of the present disclosure, an electronic device is provided. The electronic device includes a display, a communication circuit, and a processor electrically connected with the display and the communication circuit. The processor may be configured to display at least one data cluster containing user intent information on the display, select a data cluster to be applied to an application among the at least one data cluster according to a user input, filter at least one content or service among content and services available in the application based on the selected data cluster, and display an item corresponding to the at least one filtered content or service on the display.

In accordance with another aspect of the present disclosure, a method for filtering content in an electronic device is provided. The method includes displaying at least one data cluster containing user intent information, selecting a data cluster to be applied to an application among the at least one data cluster according to user input, filtering at least one content or service among content and services available in the application based on the selected data cluster, and displaying an item corresponding to the at least one filtered content or service on a display.

In accordance with another aspect of the present disclosure, a non-transitory computer readable recording medium for storing instructions for filtering content in an electronic device is provided. The instructions configure a processor to display at least one data cluster containing user intent information on a display, select a data cluster to be applied to an application among the at least one data cluster according to a user input, filter at least one content or service among content and services available in the application based on the selected data cluster, and display an item corresponding to the at least one filtered content or service on the display, wherein the user intent information is associated with a value to filter the content available in the application.

According to various embodiments of the present disclosure, it is possible to provide a method and apparatus for filtering content based on user intent in an electronic device.

According to various embodiments of the present disclosure, it is further possible to filter or search content or services provided by an application on the basis of user intent.

According to various embodiments of the present disclosure, it is still further possible to provide content or services matching user intent by filtering content or services provided by an application by use of data clusters.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
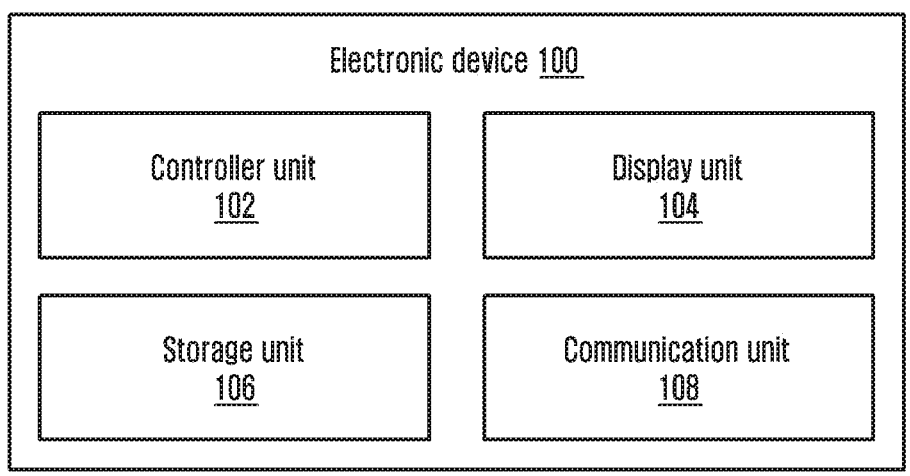
FIG. 1 illustrates an electronic device for filtering content available in an application for a received data cluster according to various embodiments of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only, and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

The embodiments herein disclose a method for filtering content in an electronic device. The method includes receiving a data cluster as an input to filter content available in an application. The data cluster includes and indicates user intent information. For example, user intent information may include information regarding user interests and preferences obtained by the electronic device through analysis of usage histories for applications and content. Information on the user, interests or preferences may include at least one vector value assigning weights or probabilities to one or more topics. Further, the method includes filtering the content available in the application to identify at least one item for the received data cluster. Still further, the method includes causing the display of the identified at least one item on the electronic device.

In an embodiment, the user intent information may include user vectors, ad-words, user locations (past and present), objective user data collections, or combinations thereof.

In an embodiment, the user intent information may be associated with a value to filter the content available in the application. The value may be dynamically determined and allocated based on a type of application.

In an embodiment, the user intent information may be computed using an incremental latent dirichlet allocation (iLDA) supervised model, unsupervised model, key verticals extraction, or combinations thereof.

In an embodiment, the data cluster includes data from a plurality of data sources. The data cluster may be determined based on the user intent information.

In an embodiment, the item may correspond to the content available in the application. In an embodiment, the item may correspond to a service offered by a content provider.

In an embodiment, the method further comprises dynamically changing the data of the data cluster based on a parameter associated with the user intent information. For example, the parameter may comprise at least one of a time of day, day of week, or week of month.

For example, consider a scenario where the user may perform a long press on the data cluster. The long press on the data cluster allows the user to copy the data cluster for using it as a filter with any installed application in the electronic device. The filter can be applied to any application installed in the electronic device. Further, the filter may work in two modes such as a content filter or as a functional filter. The mode of the filter may be determined by the application on which the filter is applied.

For example, if the data cluster is to be used in the content filter mode then, the application need not be modified and platform service takes care of the filter. In the case of functional filters, some of the applications may need to be modified.

Unlike the systems and methods of the related art, the proposed system and method provides a mechanism for extracting user intent information for each data cluster. The extracted user intent information may be used for filtering the content available in the application, thus identifying the items which are of user interest. In an example, the data clusters including the user intent information may be used for extracting personalized search results from various applications installed in the electronic device. The data clusters may include user vectors, ad-words, and contextual vectors which are used to narrow search results.

In an embodiment, the user may browse uniform resource locators (URLs) by entering a query in a browser. The electronic device waits for a fixed number of URLs to be browsed by the user before initiating a clustering process. Initially, the electronic device will use pre-loaded data clusters such as sports clusters, news clusters, music clusters, CNN clusters, and IPL clusters to initiate mapping of one or more URLs browsed or browsing by the user into corresponding data clusters. Before mapping the browsed URLs to the corresponding data clusters, the electronic device extracts the semantic content, including a word vector or a structure data or topic, from the browsed URLs. The electronic device maps the semantic content to categorize the user browsed URLs into the data cluster using an incremental model.

In an embodiment, a web cluster framework constructs a plurality of data clusters based on the usage information, such as browsing history, email, chat, short message service (SMS), social data, or the like, corresponding to a user. The data clusters are constructed based on the semantic content and their semantic relations and similarity using latent semantic analysis schemes. Each data cluster is defined by a probabilistic vector that defines characteristics of the cluster and thus, blends well with applications or services having backend content "searchable" through specific features. In the following description, a detailed description is given of a scheme to provide specific data associated with the user of the electronic device.

Unlike the systems and methods of the related art, the proposed system and method provides an easy to use search mechanism by using the data clusters including the user intent information thus, improving the relevancy of the search results when the user is searching for the content. The user is provided with the search results which are more relevant to the user's preferences and interest.

Referring now to the drawings, and more particularly to FIGS. 1 to 13, where similar reference characters denote corresponding features consistently throughout the figures, there are shown a number of embodiments.

FIG. 1 illustrates an electronic device for filtering content available in an application for a received data cluster according to various embodiments of the present disclosure.

Referring to FIG. 1, an electronic device 100 can be, for example a laptop computer, desktop computer, mobile phone, smart phone, personal digital assistants (PDAs), tablet, phablet, consumer electronic device, or any other electronic device, but embodiments are not limited thereto. In an embodiment, the electronic device 100 may include a controller unit 102, a display unit 104, a storage unit 106, and a communication unit 108.

The controller unit 102 can be configured to perform one or more actions for filtering the content available in the application to identify the items for the received data cluster. Further, the controller unit 102 can be configured to receive a data cluster as an input to filter content available in an application. The data cluster includes and indicates user intent information and data from a plurality of data sources. The user intent information that defines each data cluster is specific to the user associated with the electronic device 100 and therefore, reflects the topic of interests and type of interest of the user. For example, user intent information may include information regarding user interests and preferences obtained by the electronic device through analysis of usage histories for applications and content. Information on the user, interests or preferences may include at least one vector value assigning weights or probabilities to one or more topics. The data sources can include SMS applications, call log applications, user documents, browser applications, contacts applications, and one or more social networking service (SNS) sources. For example, the SNS sources can include an image application, fan following page application, chat application, messenger application, user event data, calendar data, user privacy policy data, media data (e.g., photos, or video clips), or the like, but embodiments are not limited thereto.

In an embodiment, the application can be any application installed in the electronic device 100, browser based search interface, database, or the like. The user intent information may include user vectors, ad-words, user locations (past and present), objective user data collections, or combinations thereof. The user intent information may be computed using an iLDA supervised model, unsupervised model using LDA or similar latent topic model algorithms, key verticals extraction, or combinations thereof.

In an embodiment, the following operations and Equations may be used for generating a supervised models:
Data collection for pre-defined categories;
Selection of disparate topic categories (small batches);
LDA based model generation;
Model merge: normalization across all batches and merging; and $$P(Z_i | Z_{i/j}, w_i) \alpha \frac{n_{Z_i,i|j}^{(Wj)} + \beta n_{Z_i,i|j}^{(dj)} + \alpha}{n_{Z_i,i|j}^{(i)} + W\beta n_{i,i|j}^{(dj)} + K\alpha} \quad \text{Equation 1}$$

In Equation (1), K is a number of topics, W is a vocabulary size $Z_i$ that represents an $i^{th}$ topic assignment, $n_{Z_i,i|j}^{(Wj)}$ represents a word-topic $Z_j$ assignment, and $n_{Z_i,i|j}^{(dj)}$ is a document to topic $Z_j$ assignment. Parameters α and β represent Dirichlet distribution for topics per document and word distribution per topic respectively. The inference process employs a back-propagation process that conditions previous (i-n) word-topic distribution based on word-topic distribution ($n_{Z_i,i|j}^{(Wj)}$) extracted from document $D_i$.

In an embodiment, topic estimation may be performed on data clusters based on a threshold within supervised topic categories. Further, cluster labeling scheme may be performed on emerged data clusters as illustrated by Equation (2) below.

$$w_l^* = \text{argmax}_w \left( \sum_{i=0}^{d} \left( (tf(w, i) * P_{il}) / \left( \log\left(\frac{|D|}{|D_w|}\right) \right) \right) \right) \quad \text{Equation 2}$$

In Equation (2), $w_l^*$ is a label of an $l^{th}$ data cluster, $P_{il}$ is a probability of $i^{th}$ document in $l^{th}$ data cluster, tf(w,i) is a term frequency of word-w in $i^{th}$ document, $D_w$ is documents in which word w is present, and D is total documents in the data cluster.

In an embodiment, the key vertical data such as the user vectors, ad-words, user locations (past and present) and objective user data collections may be extracted from the data sources associated with the user.

Further, the user intent information may be associated with a value to filter the content available in the application. The value may be dynamically determined and allocated based on a type of the application. In an example, if the data cluster is "POLITICS", the user vector and user vector values (i.e., probability value) can be {('Congress', 0.0117); ('India', 0.0102); ('BJP', 0.0085); ('Singh', 0.0057); ('Minister', 0.0049); ('Elections', 0.0041)}.

After receiving the data cluster, the controller unit 102 can be configured to filter the content available in the application to identify at least one item. For example, the controller unit 102 may find at least one piece of content matching the user intent in the application on the basis of the data cluster. Further, the controller unit 102 can cause the display of the identified items on the display unit 104. The items displayed on the display unit 104 correspond to the content available in the application or service offered by a content provider. Further, the controller unit 102 can be configured to dynamically change the data of the data cluster based on a parameter associated with the user intent information. The parameter may include a selected time duration such as a time of day, day of week, or week of month.

In an embodiment, each data cluster is a structure supporting multiple data types. For example, a data cluster on "football" includes the below described vectors:

User Vector (i.e., User Topic Vector);

Ad-words with metadata information (i.e., recent, relevance, depth); and

Contextual vector (i.e., when the data cluster accessed, where the data cluster accessed, or the like).

Further, depending on which application the data cluster is dragged over, the proposed system and method makes use of the one or more vectors of the enhanced data cluster assigning one vector-type priority over the other. In an example, dragging the "football" data cluster over the shopping database application, the ad-word vector may be given more priority over the user vector and contextual vector.

Further, the storage unit 106 may store the data clusters. The storage unit 106 may include one or more computer-readable storage media. The storage unit 106 may also include non-volatile storage elements. Examples of such non-volatile storage elements may include magnetic hard disks, optical disks, floppy disks, flash memories, or forms of electrically programmable read only memories (EPROMs) or electrically erasable and programmable ROM (EEPROM) memories. In addition, the storage unit 106 may, in some examples, be considered a non-transitory storage medium. The term "non-transitory" may indicate that the storage medium is not embodied in a carrier wave or a propagated signal. However, the term "non-transitory" should not be interpreted to mean that the storage unit 106 is non-movable. In some examples, the storage unit 106 can be configured to store larger amounts of information than the memory. In certain examples, a non-transitory storage medium may store data that can, over time, change (e.g., in random access memory (RAM) or cache). The communication unit 108 establishes communication sessions between various units supported in the electronic device 100.

In an example, consider a scenario where the electronic device 100 includes data clusters such as a sports data cluster, news data cluster, music data cluster, CNN data cluster, and IPL data cluster. Each data cluster may include user intent information. A user may select the IPL data cluster as the input to filter the content available in an application (i.e., cricket database). The user may drag the selected IPL data cluster over the cricket database, and the user vector and user vector values may be applied to the cricket database. The user vector and user vector values determine a search query to be formulated for the cricket database, and the content available in the cricket database may be filtered to identify the corresponding items of the IPL which are of interest to the user.

In another example, the user may select the cricket data cluster as the input to filter the content available in the video application database. The user may drag the selected cricket data cluster over the video application database. By using the user vector and user vector values associated with the cricket data cluster, the search query may be formulated using the topmost keywords from the cricket data cluster. The formulated search query may be sent to the video application server. After receiving the search query, the server may filter the content available in the video application database to identify the items related to cricket. The identified items may be displayed to the user.

Though FIG. 1 shows a limited overview of the electronic device 100, it is to be understood that other embodiments are not limited thereto. Further, the electronic device 100 can include any number of units communicating with each other to perform functions and operations as known to those skilled in the art. Accordingly, details of such additional units are omitted.

The electronic device according to an embodiment of the present disclosure (e.g. electronic device 100 of FIG. 1) may include a display (e.g. display unit 104 of FIG. 1), a communication circuit (e.g. communication unit 108 of FIG. 1), and a processor (e.g. controller unit 102 of FIG. 1) electrically connected with the display and the communication circuit. The processor may be configured to display at least one data cluster containing user intent information on the display, select a data cluster to be applied to an application among the at least one data cluster according to user input, filter at least one content or service among content and services available in the application on the basis of the selected data cluster, and display an item corresponding to the at least one filtered content or service.

In an embodiment, the user intent information may include information regarding user interests and preferences obtained through analysis of application or content usage histories. In an embodiment, the user intent information may include at least one of a user vector associated with a topic, ad-words, a user location (past and present), and an objective user data collection.

In an embodiment, the controller unit may assign weights to a user vector, ad-words, user location (past and present), and objective user data collection according to the application.

In an embodiment, the user intent information may be associated with a value to filter the content available in the application. The processor may dynamically determine or allocate the filtering value on the basis of the type of application.

In an embodiment, the processor may set a parameter associated with the user intent information according to user input, and may dynamically determine or allocate the filtering value on the basis of the parameter. In an embodiment, the parameter may include information on a duration during which to analyze application or content usage histories.

Figure 2:
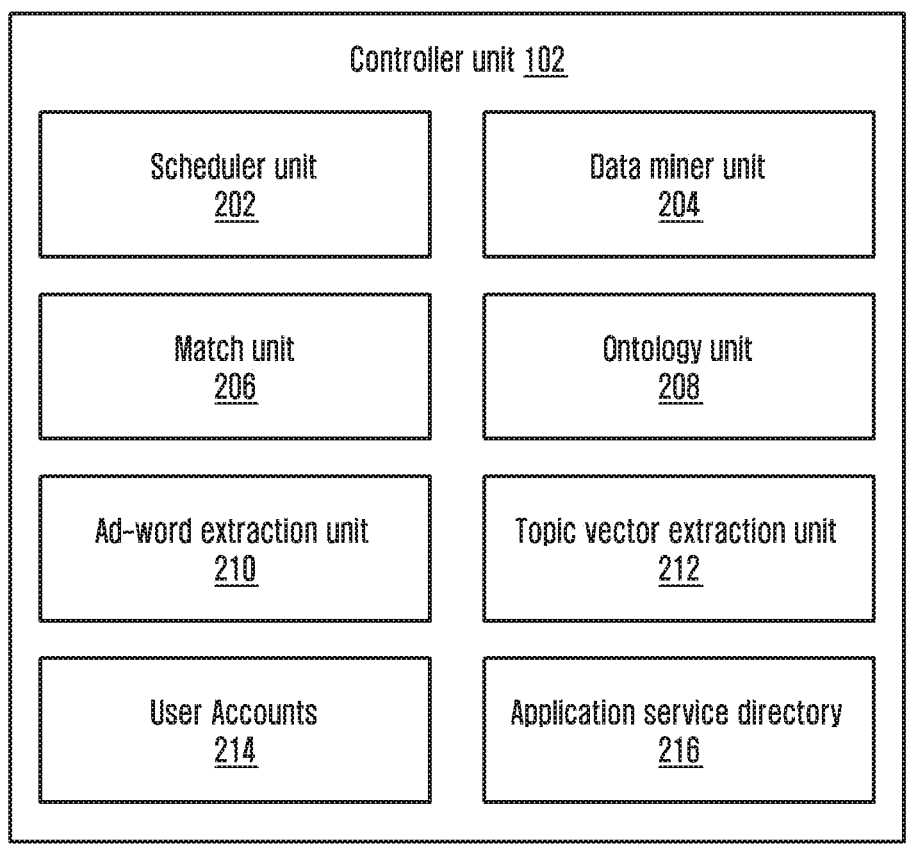
FIG. 2 illustrates various units of a controller unit for filtering content available in an application for a received data cluster according to various embodiments of the present disclosure.

FIG. 2 illustrates various units of a controller unit for filtering content available in an application for a received data cluster according to various embodiments of the present disclosure.

Referring to FIG. 2, the controller unit 102 may include a scheduler unit 202, a data miner unit 204, a match unit 206, an ontology unit 208, an ad-word extraction unit 210, a topic vector extraction unit 212, user accounts 214, and an application service directory 216.

The scheduler unit 202 can be configured to schedule the data cluster and topic extraction process according to pre-set criteria such as scheduling the data cluster when charging is "ON", the data cluster receiving "N" number of documents, or the like. Further, the data miner unit 204 can be configured to extract user specific vectors from the content based on the settings that pertain to specific user interests within an already identified topic.

The match unit 206 can be configured to perform matching between the extracted topic vectors from the content and supervised topic vectors, for the purpose of the data cluster. The ontology unit 208 can be configured to maintain the topic vocabulary used by the system including topics and their relations to each other. Further, the ontology unit 208 may perform model management such as updating models, their vocabulary, or the like.

The ad-word extraction unit 210 can be configured to extract the product specific information within the content. Further, the topic vector extraction unit 212 is used by both LDA and iLDA for extracting user vectors (i.e., word vectors and their probability) that will be used for further inferences. The user accounts 214 can be configured to maintain the user specific accounts including possible user profiles and interest vectors. The application service directory 216 may list applications, their backend application data address for sending filter queries, types of queries accepted along with associated parameters and accepted data types.

FIG. 2 shows a limited overview of the controller unit 102 and, it is to be understood that embodiments are not limited thereto. Further, the controller unit 102 can include any number of units communicating with each other to perform functions and operations as known to those skilled in the art. Accordingly, details of such additional units are omitted.

Figure 3:
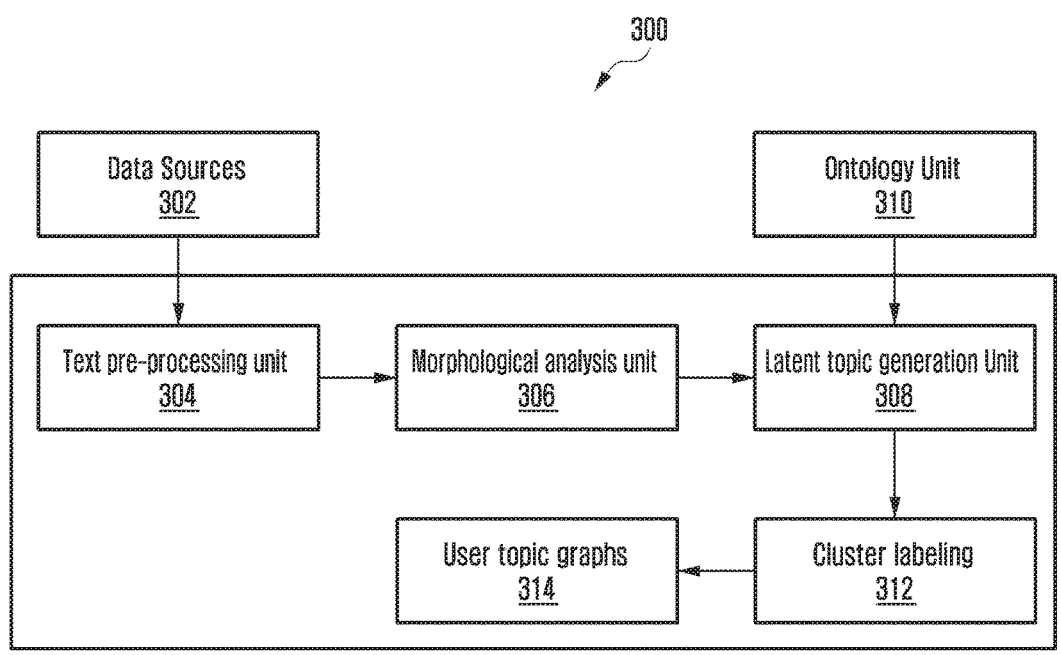
FIG. 3 illustrates a data cluster framework according to various embodiments of the present disclosure.

FIG. 3 illustrates a data cluster framework according to various embodiments of the present disclosure.

Referring to FIG. 3, a data cluster framework 300 may include data sources 302, a text pre-processing unit 304, a morphological analysis unit 306, a latent topic generation unit 308, an ontology unit 310, a cluster labeling unit 312, and user topic graphs 314.

The data sources 302 can include an SMS application, a call log application, user documents, browser applications, contacts applications, and one or more SNS sources. The SNS sources can include for example, an image application, fan following page application, chat application, messenger application, user event data, calendar data, user privacy policy data, media data (e.g., photos, or video clips), or the like, but embodiments are not limited thereto.

The text pre-processing unit 304 may dynamically collate the usage information of one or more data sources 302 in the electronic device 100. In an embodiment, the user's historical data such as browser URL history, browser web-pages, browser feeds, social network updates, or the like, may be stored in various applications. The text pre-processing unit 304 may remove embedded advertisements, repetitive contents (e.g., headlines in news web-pages that get repeated in every webpage) from the collated usage information of the data sources 302. The text pre-processing unit 304 may collect data associated with embedded links in the data sources 302. For example, if there is no image mentioned in the metadata of any social feed, then the text pre-processing unit 304 may extract the main image along with the main article from the embedded links to visualize the topics formed in the electronic device 100.

The text pre-processing unit 304 may send the collated information to the morphological analysis unit 306. After receiving the collated information, the morphological analysis unit 306 may preprocess the user information. Further, the morphological analysis unit 306 may send the preprocessed user information to the latent topic generation unit 308. The ontology unit 310 can be configured to maintain the topic vocabulary used by the system including topics and their relations to each other. Further, the ontology unit 310 may perform model management such as updating models, their vocabulary, or the like.

In an embodiment, the latent topic generation unit 308 may generate new topics if they are not supported by the ontology unit 310. This provides unsupervised topic emergence that adds new topics to the existing supervised topic list. The cluster labeling unit 312 may provide a label for the newly emerged topics. The user topic graphs 314 may build the user vectors and maintain the user vectors as a parsable and traversable tree structure where topics are interconnected as nodes along with their relations that can also be captured within the ontology unit 310.

FIG. 3 shows a limited overview of the data cluster framework 300 and, it is to be understood that embodiments are not limited thereto. Further, the data cluster framework 300 can include any number of units communicating with each other to perform functions and operations as known to those skilled in the art. Accordingly, details of such additional units are omitted.

Figure 4:
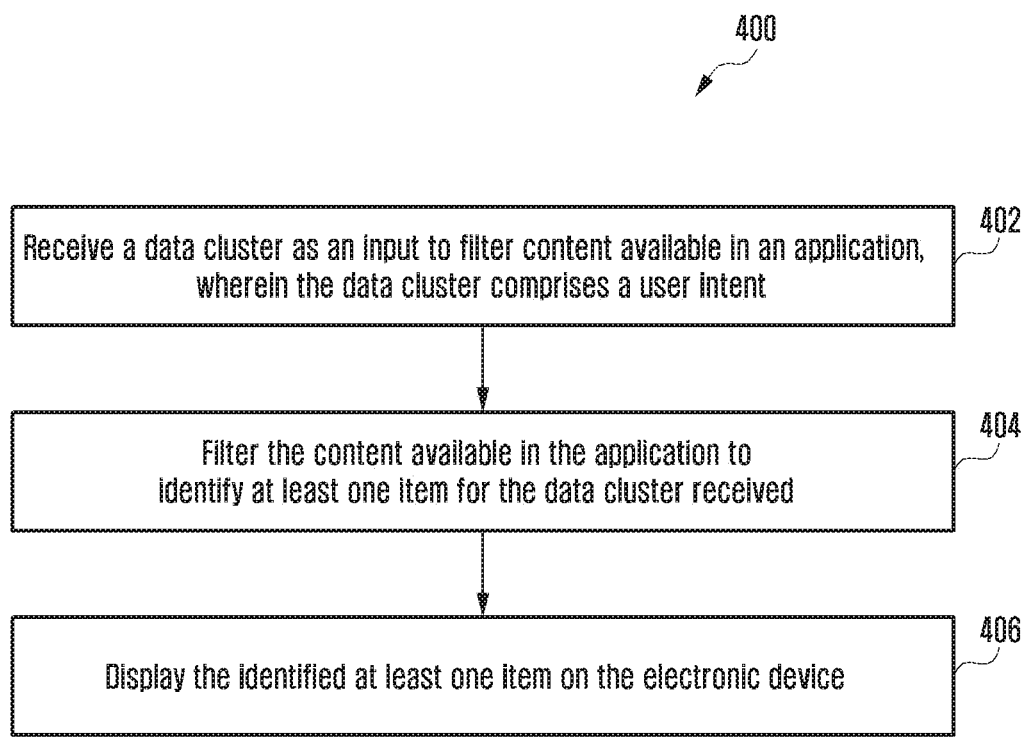
FIG. 4 is a flow chart illustrating a method for filtering content in an electronic device according to various embodiments of the present disclosure.

FIG. 4 is a flow chart illustrating a method for filtering content in an electronic device according to various embodiments of the present disclosure.

Referring to FIG. 4, a method 400 for filtering content in an electronic device is shown. In operation 402, the method 400 may include receiving a data cluster as an input to filter content available in an application. In an embodiment, the data cluster may include user intent information. The method 400 allows the controller unit 102 to receive the data cluster as the input to filter the content available in the application. For example, the user intent information may include user vectors, ad-words, user locations (past and present), objective user data collections, or combinations thereof. The user intent information may be computed using the iLDA supervised model, unsupervised model, key verticals extraction, or combinations thereof. In an embodiment, the user intent information may be associated with a value to filter the content available in the application. The filtering value may be dynamically determined and allocated based on the type of application. In an embodiment, the application can be any application installed in the electronic device 100, a browser based search interface, a database, or the like.

In operation 404, the method 400 may include filtering content available in the application to identify items based on the received data cluster. For example, the method 400 allows the controller unit 102 to filter the content available in the application to identify items based on the received data cluster. In an embodiment, the electronic device may search content through an application on the basis of the received data cluster. For example, the electronic device may find at least one content corresponding to the user intent information by applying the data cluster to the application.

In operation 406, the method 400 may include causing the display of the identified items on the electronic device 100. For example, the method 400 allows the controller unit 102 to display the identified items on the electronic device 100.

In an embodiment, the user may perform a drag and drop gesture to provide the data cluster including the user intent information as input onto the application. In an embodiment, the data cluster including the user intent information may be used as a search string to filter content available in the application and to identify content or services offered by the content provider (i.e., items). Further, the identified content or services offered by the content provider may be displayed as search results to the user of the electronic device 100.

In an embodiment, the user may select the data cluster by performing a touch gesture to view the list of relevant applications. In an embodiment, the selected cluster may be used as the input to filter the content available in the application.

In an embodiment, the user may type keywords on a search interface to view the related data clusters. For example, the relevant data clusters may be suggested to the user on the search interface, when the user types the keywords.

In an embodiment, different weightage can be assigned to each vector within the data cluster. For example, the weightage may vary from application to application depending on the type or context of the application to customize and personalize the search results (i.e., items) for individual users.

The various actions, acts, blocks, operations, or the like, in method 400 may be performed in the order presented, in a different order or simultaneous order. Further, in some embodiments, some of the actions, acts, blocks, operations, or the like, may be omitted, added, modified, skipped, or the like, without departing from the scope of the disclosure.

According to an embodiment of the present disclosure, a method for filtering content in the electronic device may include operations for displaying at least one data cluster containing user intent information, selecting a data cluster to be applied to an application among the at least one data cluster according to user input, filtering at least one content or service among content and services available in the application on the basis of the selected data cluster, and displaying an item corresponding to the at least one filtered content or service.

In an embodiment, the user intent information may include information regarding user interests and preferences obtained through analysis of application or content usage histories.

In an embodiment, the user intent information may include at least one of a user vector associated with a topic, ad-words, user location (past and present), and objective user data collection.

In an embodiment, the method may further include assigning weights to a user vector, ad-words, user location (past and present), and objective user data collection according to the application.

In an embodiment, the user intent information may be associated with a value to filter the content available in the application. The method may further include dynamically determining or allocating the filtering value on the basis of the type of application.

In an embodiment, the method may include setting a parameter associated with the user intent information according to user input, and dynamically determining or allocating the filtering value on the basis of the parameter. The parameter may include information on the duration during which to analyze application or content usage histories.

Figure 5:
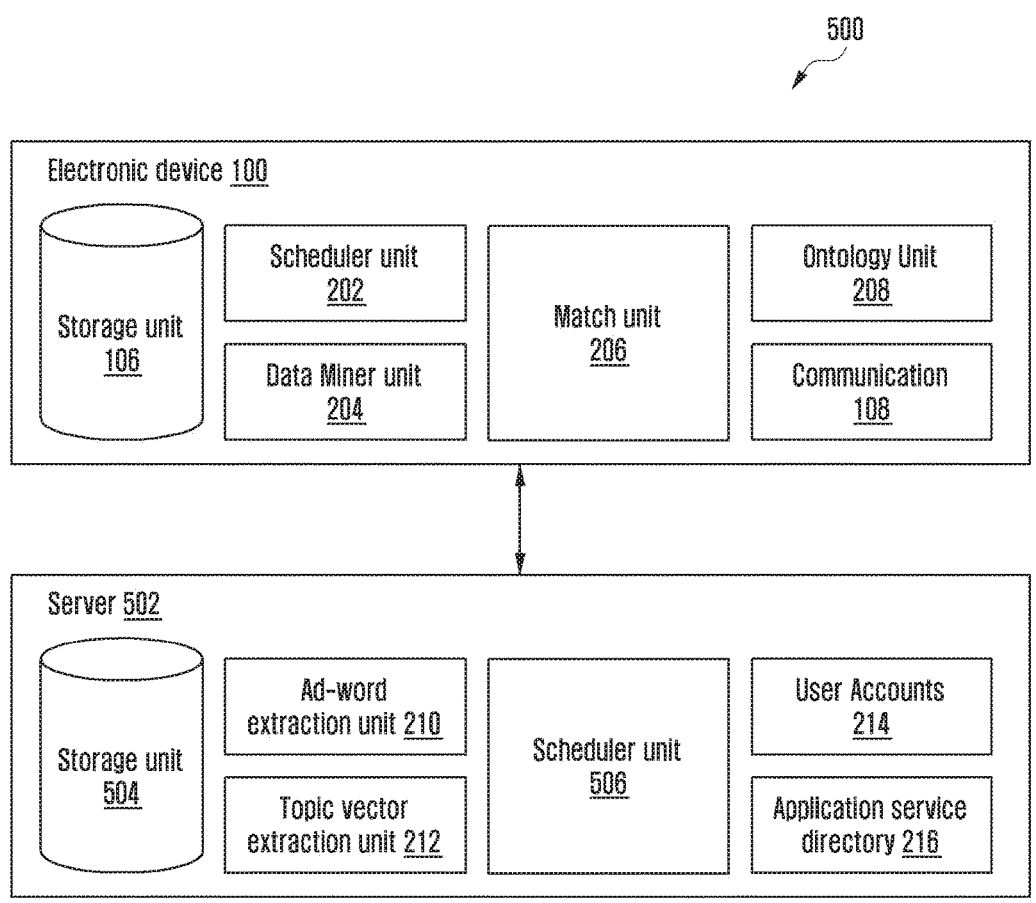
FIG. 5 illustrates a client-server architecture for filtering content available in an application for a received data cluster according to various embodiments of the present disclosure.

FIG. 5 illustrates a client-server architecture for filtering content available in an application for a received data cluster according to various embodiments of the present disclosure.

Referring to FIG. 5, in an embodiment, a client-server architecture 500 may include the electronic device 100 and a server 502.

The electronic device 100 may include the storage unit 106, the scheduler unit 202, the data miner unit 204, the match unit 206, the ontology unit 208, and the communication unit 108. In an embodiment, the server 502 may include a storage unit 504, the ad-word extraction unit 210, the topic vector extraction unit 212, a scheduler unit 506, user accounts 214, and the application service directory 216.

In an embodiment, the scheduler unit 202 can be configured to schedule a data cluster and topic extraction process according to pre-set criteria such as scheduling the data cluster when charging is "ON", the data cluster receiving "N" number of documents, or the like. In an embodiment, the data miner unit 204 can be configured to extract user specific vectors from content based on the settings that pertain to specific user interest within an already identified topic.

In an embodiment, the match unit 206 can be configured to perform matching between extracted topics vectors from the content and supervised topic vectors, for the purpose of the data cluster. In an embodiment, the ontology unit 208 can be configured to maintain a topic vocabulary used by the system including topics and their relations to each other. In an embodiment, the ontology unit 208 may perform model management such as updating models, their vocabulary, or the like. Further, the functionalities of the communication unit 108 are explained in conjunction with FIG. 1, therefore additional descriptions are omitted.

The functionalities of the storage unit 504 are explained in conjunction with the storage unit 106 as shown in FIG. 1, therefore additional descriptions are omitted. In an embodiment, the ad-word extraction unit 210 can be configured to extract product specific information within the content. In an embodiment, the topic vector extraction unit 212 may be used by both LDA and iLDA for extracting user vectors (i.e., word vectors and their probability) that will be used for further inferences.

In an embodiment, the scheduler unit 506 can be configured to schedule the data cluster and topic extraction process according to pre-set criteria such as scheduling the data cluster when charging is "ON", the data cluster receiving "N" number of documents, or the like. In an embodiment, the user accounts 214 can be configured to maintain user specific accounts including possible user profiles and interest vectors. In an embodiment, the application service directory 216 may list applications, their backend application data address for sending filter queries, type of queries accepted along with associated parameters and accepted data types.

In an embodiment, the functionalities performed by the electronic device 100 and the server 502 can be performed solely by the electronic device 100 and the composition of the server 502 can be modified accordingly.

In an embodiment, the server 502 may provide enhanced functionality through extended user vector extraction and ad-words extraction. Further, heavy processing such as latent semantics based extraction can occur on the server 502. In an embodiment, the user vectors may be used as background filters by the server 502 to filter the content available in the application. For example, by using the query-response model, the electronic device 100 can fetch the user vectors and ad-words from the server 502. Unlike the systems and methods of the related art, new applications can be quickly supported via server directory additions. The server 502 supports REST full interfaces to the client and third parties for registration.

In an embodiment, the client (i.e., electronic device 100) may perform cluster action to extract semantics from the content, and mapping to either a fixed data cluster or an unsupervised data cluster. Further, the client may send the content and inferred data cluster to the server 502. The server 502 may receive the content and the data cluster which is referred to as one or more topics. In an embodiment, after receiving the content and their corresponding data clusters, the server 502 may extract the user intent information (i.e., user vector and ad-words). The extracted user intent information may be sent back to the client based on the request from the client. The client may filter the content by using the user intent information and connecting to the application service. For example, the client may search content in an application on the basis of the user intent information.

The electronic device according to an embodiment of the present disclosure may include a display, a communication circuit, and a processor electrically connected with the display and the communication circuit. The processor may be configured to select a data cluster to be applied to an application among at least one data cluster containing user intent information according to user input, send the selected data cluster through the communication circuit to an external server, receive information on content filtered by the external server on the basis of the selected data cluster through the communication circuit from the external server, and display at least one content filtered with respect to the selected data cluster on the display by use of the information received from the external server.

In an embodiment, the information on filtered content may include webpage or URL information for the filtered content.

The server according to an embodiment of the present disclosure, may include a communication circuit and a processor electrically connected with the communication circuit. The processor may receive a data cluster containing user intent information through the communication circuit from an external electronic device, filter content available in an application on the basis of the received data cluster, and send information on the filtered content through the communication circuit to the external electronic device.

Figure 6A:
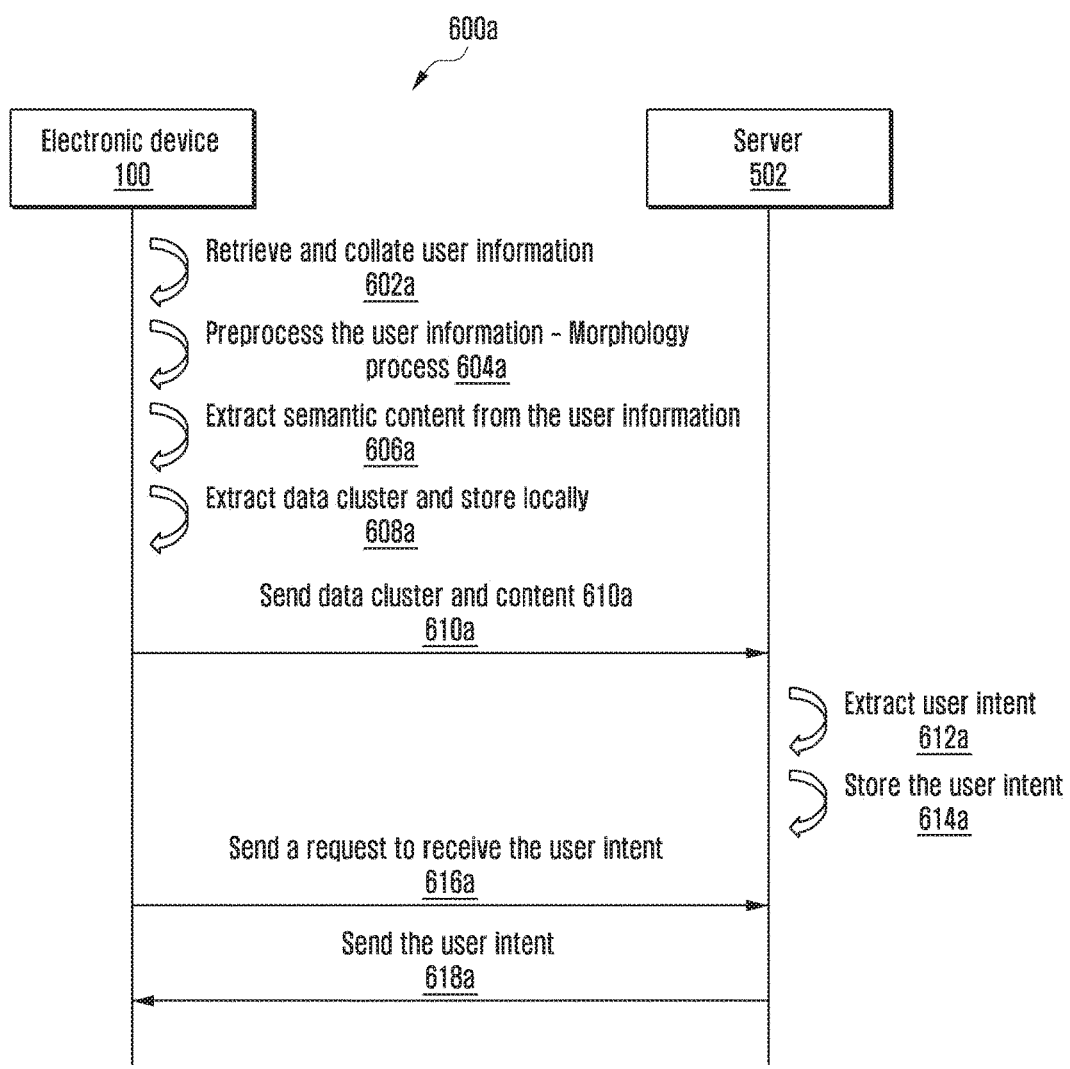
FIG. 6A illustrates a sequence for extracting user intent information by considering user data available in a data cluster according to various embodiments of the present disclosure.

FIG. 6A illustrates a sequence diagram for extracting user intent information by considering user data available in a data cluster according to various embodiments of the present disclosure.

Referring to FIG. 6A, a sequence diagram 600a is shown for extracting user intent information by considering user data available in a data cluster. In an embodiment, the signaling sequence depicts communication between the electronic device 100 and the server 502 of FIG. 5 for example.

In operation 602a, the electronic device 100 may dynamically retrieve and collate usage information of one or more data sources associated with a user. In an embodiment, the usage information can include browsing history, SNS information, and application usage data which are dynamically collated from the data sources. In an embodiment, the usage information of the user can include web page URLs visited by the user, emails sent by the user, emails received by the user, text messages sent by the user, text messages received by the user, documents viewed by the user, documents edited by the user, instant messages sent by the user, instant messages received by the user, user-device interactive data, user's dynamic context information, or the like.

After retrieving and collating the usage information of the data sources associated with the user, the electronic device 100 may preprocess the user information (i.e., morphological analysis) in operation 604a.

In operation 606a, the electronic device 100 may extract semantic content from the collated usage information of each data source. In an embodiment, the semantic content may include a word vector, structured data, topic, token, or the like. In an embodiment, the electronic device 100 may use an LDA algorithm to extract topic word vectors present in a document extracted from each data source. For example, a modified version may be used where extracted words are combined from web content after cleaning and morphology, with some existing or pre-loaded web content, so as to get a fine grained list of topic models for LDA refinement present within a web page. In an embodiment, the electronic device 100 may display a list of the word vectors depicting each topic present within the web page. For example, an indexing module which uses keywords or sets of keywords present within each word vector may be used to identify occurrences of each topic in the web page. For example, the electronic device may form an index denoting a set of word vectors with corresponding location identifiers within the web page. The index may give information about the specific topic that the user browses at a particular location of the web page.

In operation 608a, electronic device 100 may map the semantic content of each data source to categorize the collated usage information into the data cluster using an incremental model. Further, the electronic device 100 may store the data cluster locally.

In operation 610a, electronic device 100 may send the data cluster and content available in the data cluster to the server 502.

After receiving the data cluster and the content, the server 502 can be configured to extract the user intent information in operation 612a. In various embodiments, the user intent information may include the user vectors, ad-words, user locations (past and present), objective user data collections, or combinations thereof. In an embodiment, the user intent information may be computed using the iLDA supervised model, unsupervised model, key verticals extraction, or combination of same.

After extracting the user intent information, the server 502 may store the user intent information corresponding to the data cluster in operation 614a.

In operation 616a, the electronic device 100 can be configured to send a request to the server 502 to receive the extracted user intent information corresponding to the data cluster.

After receiving the request, the server 502 can be configured to send the user intent information to the electronic device 100 in operation 618a.

Figure 6B:
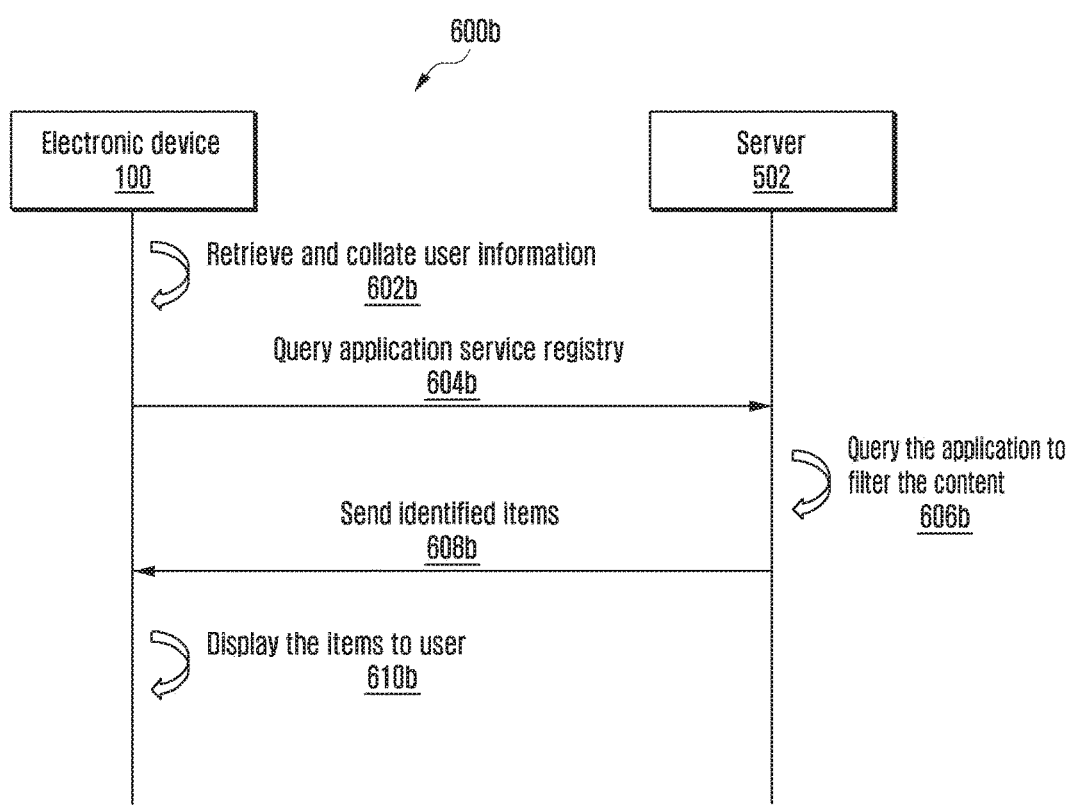
FIG. 6B illustrates a sequence for filtering content available in an application for a received data cluster according to various embodiments of the present disclosure.

FIG. 6B illustrates a sequence diagram for filtering content available in an application for a received data cluster according to various embodiments of the present disclosure.

Referring to FIG. 6B, a sequence diagram 600b is shown for filtering content available in an application for a received data cluster. In an embodiment, the signaling sequence depicts communication between the electronic device 100 and the server 502 of FIG. 5 for example.

In operation 602b, the electronic device 100 can be configured to receive a data cluster as an input to filter content available in an application. The data cluster includes the user intent information.

After receiving the data cluster as the input, the electronic device 100 can be configured to query the application service registry by sending the request to the server 502 in operation 604b.

After receiving the request, the server 502 can be configured to query the application to filter the content to identify the items in operation 606b.

After identifying the items, the server 502 can be configured to send the items to the electronic device 100 in operation 608b. For example, the server 502 may send the electronic device 100 the content or content list identified by content filtering or search. As another example, the server 502 may send the electronic device 100 an address indicating the identified content (e.g. webpage address or URL).

After the receiving the items, the electronic device 100 may display the items to the user in operation 610b. For example, the electronic device 100 may display an item corresponding to at least one content on the basis of the information received from the server 502.

According to an embodiment of the present disclosure, a method for filtering content in the electronic device may include operations for selecting a data cluster to be applied to an application among at least one data cluster containing user intent information according to user input, sending the selected data cluster to an external server, receiving information on content filtered by the external server on the basis of the selected data cluster from the external server, and displaying at least one content filtered with respect to the selected data cluster by use of the information received from the external server.

In an embodiment, the information on filtered content may include webpage information or URL for the filtered content.

According to an embodiment of the present disclosure, a method for filtering content in the server may include operations for receiving a data cluster containing user intent information from an external electronic device, filtering content available in an application on the basis of the received data cluster, and sending information on the filtered content to the external electronic device.

Figure 7:
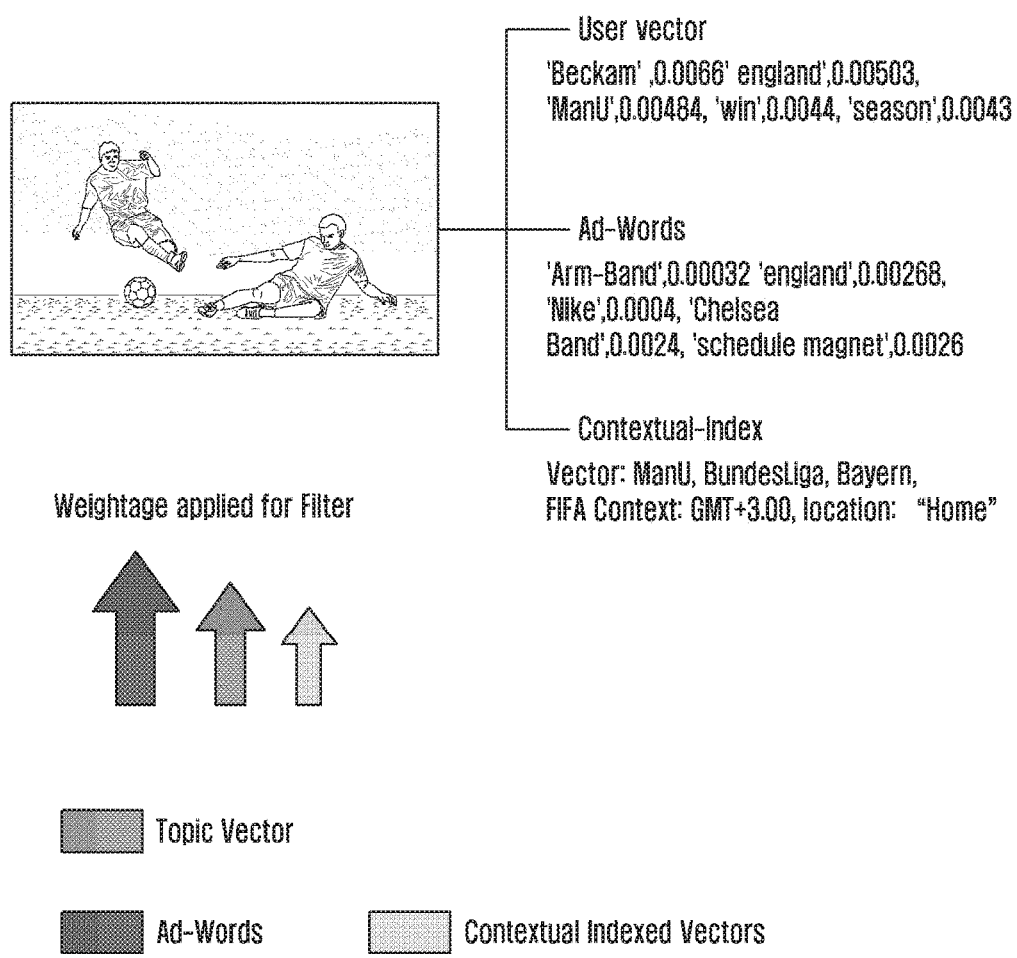
FIG. 7 illustrates a "football" data cluster including user intent information and information values according to various embodiments of the present disclosure.

FIG. 7 illustrates a "football" data cluster including user intent information and information values according to various embodiments of the present disclosure.

In various embodiments, a data cluster may include at least one user vector. For example, the data cluster may include user vectors, ad-words, and a contextual index.

In an embodiment, the electronic device may apply a data cluster to a specific application according to user input. For example, the electronic device may receive user input for dragging and dropping a data cluster on an application. The electronic device may apply the data cluster selected by user input to the selected application. In various embodiments, for filtering information by applying the data cluster to the application, the electronic device may assign different weights to multiple user vectors contained in the data cluster according to the selected application. That is, the electronic device may filter information by assigning different weights to individual user vectors according to the characteristic or type of application.

For example, referring to FIG. 7, a user vector and a probability value of a football data cluster may include applied weights as shown below:

User vector={'Beckham', 0.0066; 'England', 0.00503; ManU', 0.00484; 'Win', 0.0044; 'Season', 0.0043}.

The ad-words and the probability value of the data cluster "football" is shown below:

Ad-words={'Arm-Band', 0.00032; 'England', 0.00268; 'Nike', 0.0004; 'Chelsea Band', 0.0024; 'Schedule magnet', 0.0026}.

The contextual index of the data cluster "football" is shown below:

Contextual index=Vector: ManU, Bundesliga, Bayern, FIFA

Context: GMT+3.00, location: "Home"

In an embodiment, depending on the data cluster dragged over the application, priority is given to a specific user vector, ad-words or contextual index of the data cluster. In an example, if the data cluster is dragged over the content provider application, the ad-words may be given more priority when compared to the user vector and the contextual index. For example, when the "football" data cluster is dragged over the shopping database, the ad-words may be given more priority than the user vector and the contextual index as shown in FIG. 7.

Figure 8A:
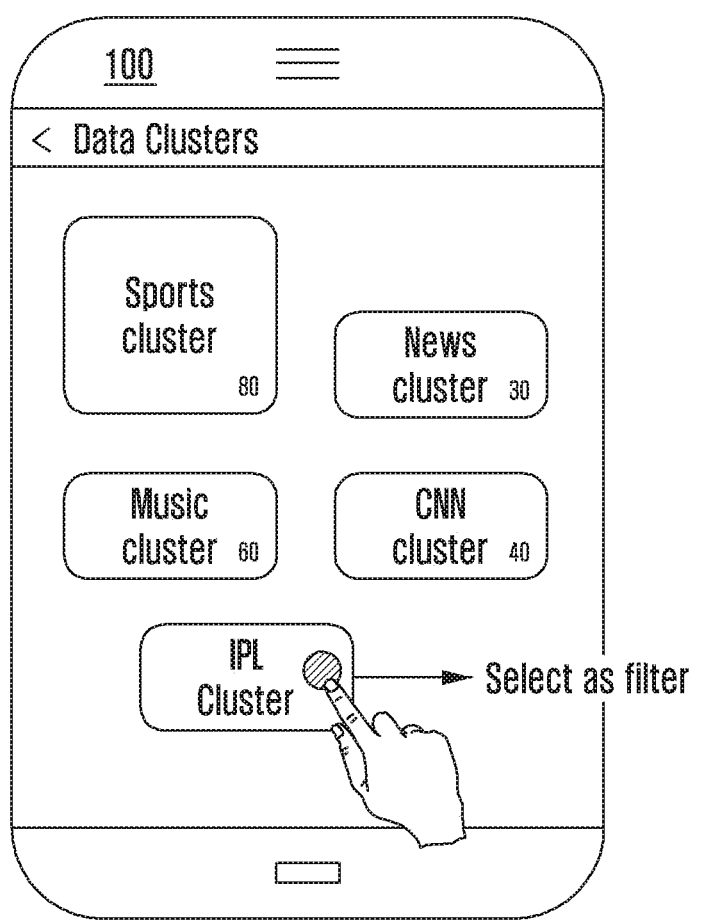
FIGS. 8A to 8C illustrate an example for filtering content in an electronic device according to various embodiments of the present disclosure.
Figure 8B:
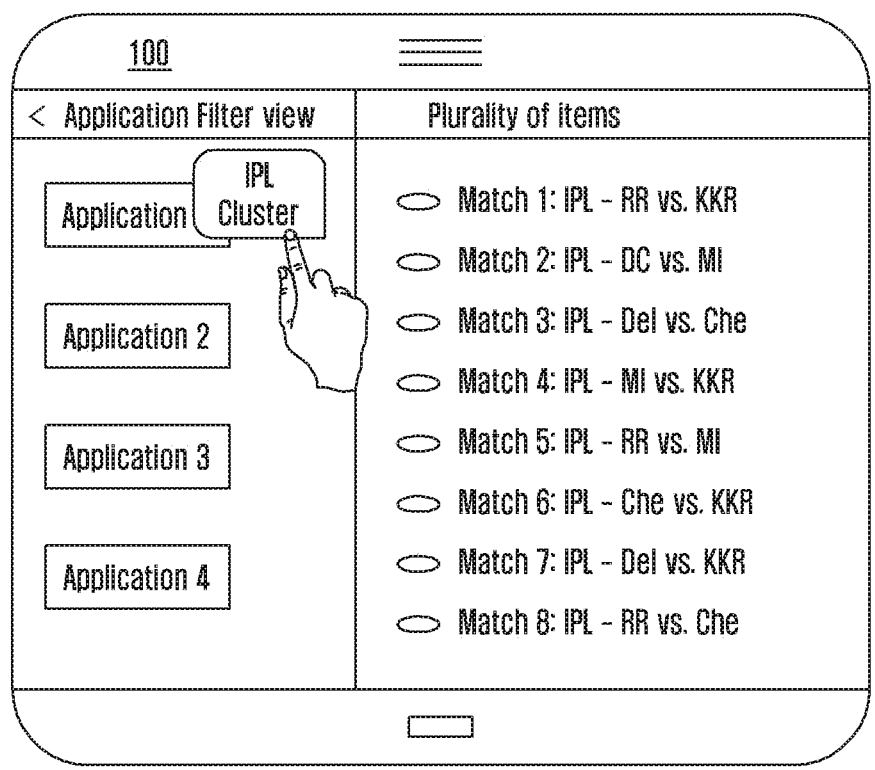
Figure 8C:
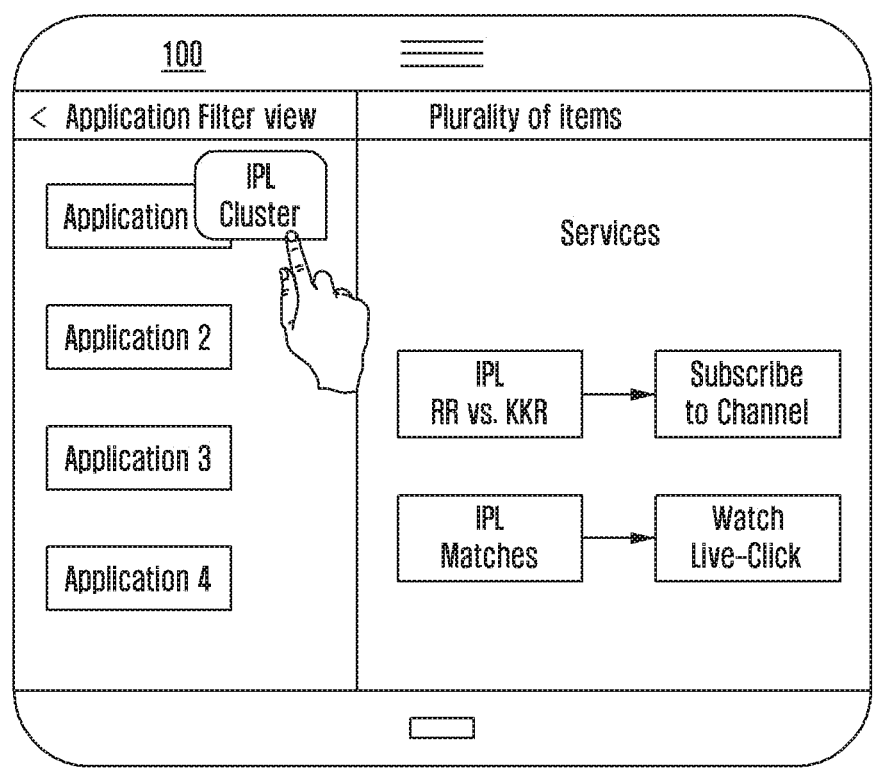

FIGS. 8A to 8C illustrate an example for filtering content in an electronic device according to various embodiments of the present disclosure.

Referring to FIG. 8A, the electronic device 100 may include data clusters such as a sports data cluster, news data cluster, music data cluster, CNN data cluster, and IPL data cluster. Each data cluster includes the user intent information and information values.

In an embodiment, the electronic device 100 may display at least one data cluster. The electronic device may receive user input for selecting one of the displayed data clusters. For example, the electronic device 100 may receive touch input for selecting one of the displayed data clusters as a filter. For example, the IPL data cluster may be selected as the input to filter the content available in the application. The user may perform a long press gesture for selecting the IPL data cluster.

Referring to FIG. 8B, after selecting the IPL data cluster as the input, the electronic device 100 may invoke and display the content filter view to the user. In the content filter view, a set of applications such as application-1, application-2, application-3, and application-4 are displayed over which the selected IPL data cluster can be applied. The user may then perform a drag and drop gesture to drop the selected IPL data cluster over application-1 as shown in FIG. 8B.

In an embodiment, when the selected IPL data cluster is dropped over application-1, the cluster semantics may be applied to application-1. The semantics of the cluster determine the search query to be formulated by using the user vector(s) corresponding to the IPL data cluster. The formulated search query is then used by application-1 to filter the content and display a plurality of items (i.e., search results) which are more specific to the user as shown in FIG. 8B.

Referring to FIG. 8C, the electronic device 100 can invoke and display the functional filter view after selecting the IPL data cluster as the input. When the selected IPL data cluster is dropped over the application-1, the cluster semantics are applied to the application-1. The semantics of the cluster determine the search query to be formulated by using ad-words corresponding to the IPL data cluster. The formulated search query may then be used by the application-1 to filter the content and cause the display of the services offered by the content provider which are more specific to the user as shown in FIG. 8C.

Figure 9:
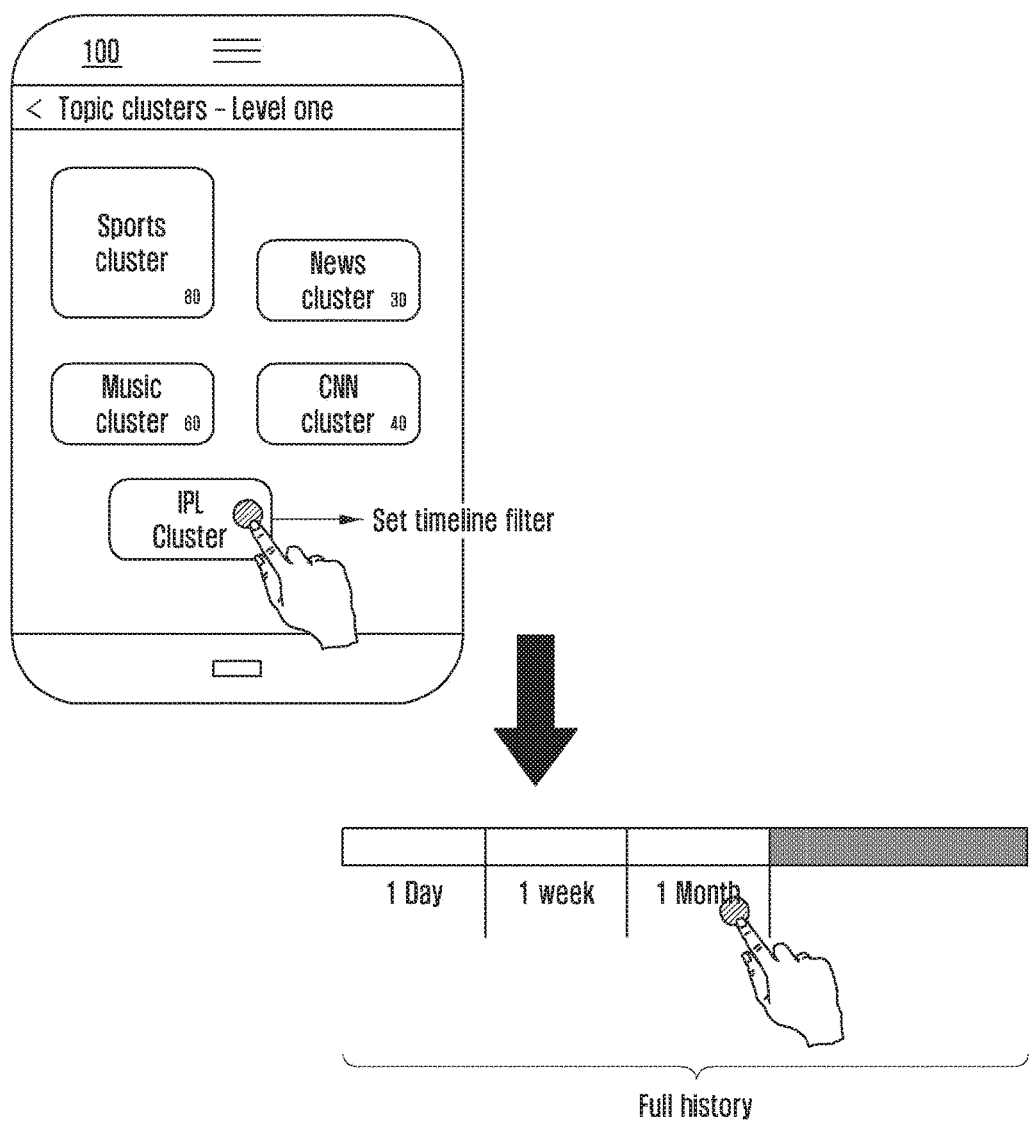
FIG. 9 illustrates addition of a time line filter to a data cluster according to various embodiments of the present disclosure.

FIG. 9 illustrates addition of a time line filter to a data cluster according to various embodiments of the present disclosure.

Referring to FIG. 9, in an embodiment, user intent information (i.e., word combination and probability distribution) can be changed based on time. Initially, user intent for the IPL data cluster can be generated by considering the complete data available in the IPL data cluster. In an embodiment, the electronic device 100 may invoke the time line filter when the user selects the IPL data cluster. The time line filter may be invoked to filter the IPL data cluster based on time, such as the past two weeks, or only the past day or past month. In various embodiments, the time period of the time line filter is not limited to a particular duration, and may be set and changed in various ways. In an embodiment, the electronic device may determine the duration to filter the data cluster according to user input. For example, the user may select a one month time period to filter the IPL data cluster as shown in FIG. 9. The content within the one month period will be used to generate the user intent information rather than using the entire content of the IPL data cluster.

In an embodiment, the data in the data cluster may be filtered based on past two weeks alone, only 1 day old, only 1 month old, or the like thus, making the filter more customized. Specifically, only the user intent inferred within the time line will be used to filter the content available in the application.

Figure 10A:
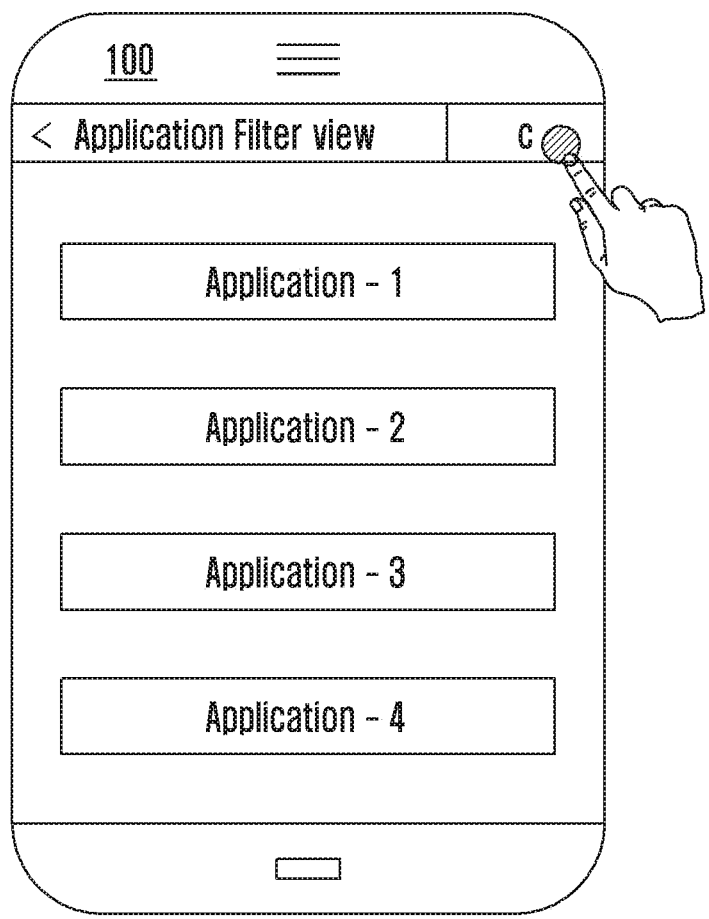
FIGS. 10A and 10B illustrate an example for invoking data clusters according to various embodiments of the present disclosure.
Figure 10B:
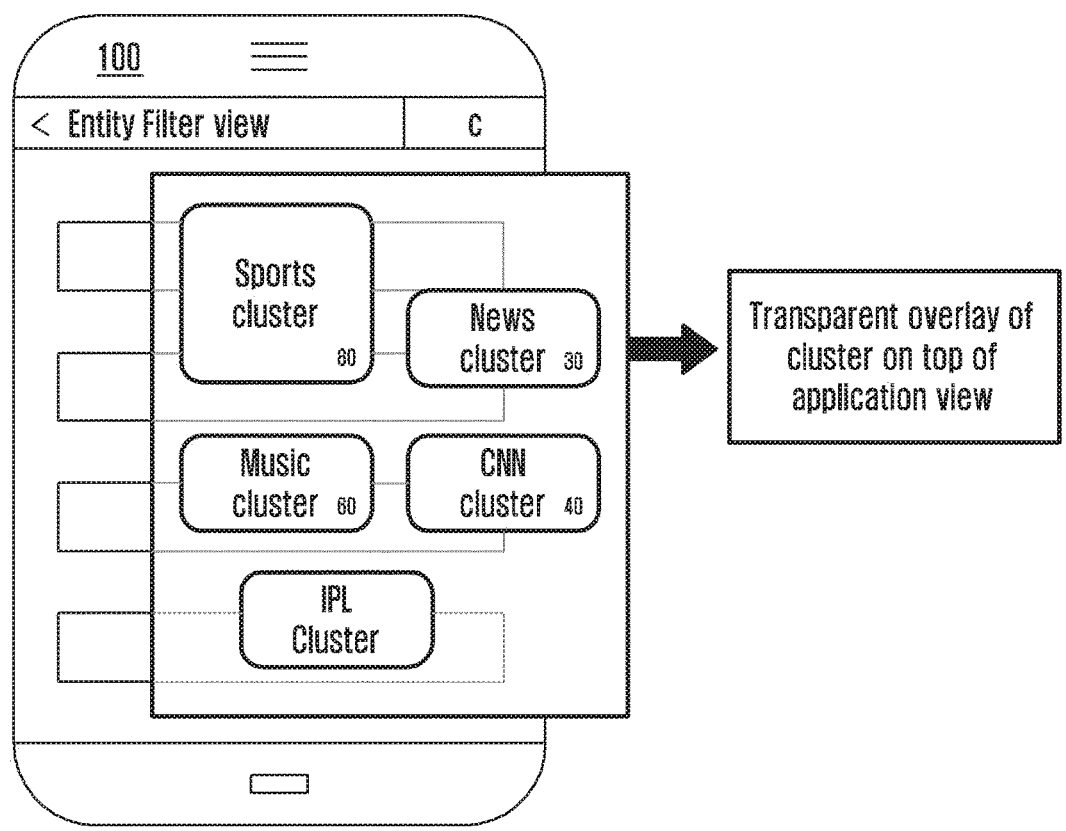

FIGS. 10A and 10B illustrate an example for invoking data clusters according to various embodiments of the present disclosure.

Referring to FIG. 10A, the electronic device 100 may display at least one application to which a data cluster is applied. The electronic device 100 may display an object for data cluster display (e.g. data cluster icon) together with an application. For example, as shown in FIG. 1 OA, the user may perform a gesture on the data cluster icon to invoke an overlay screen displaying the data clusters.

Referring to FIG. 10B, the electronic device 100 may display a screen containing at least one data cluster applicable to an application according to user input. For example, the electronic device 100 may display data clusters applicable to an application on a transparent or translucent popup window. For example, the data clusters may be displayed on top of the application view as shown in FIG. 10B.

Figure 11A:
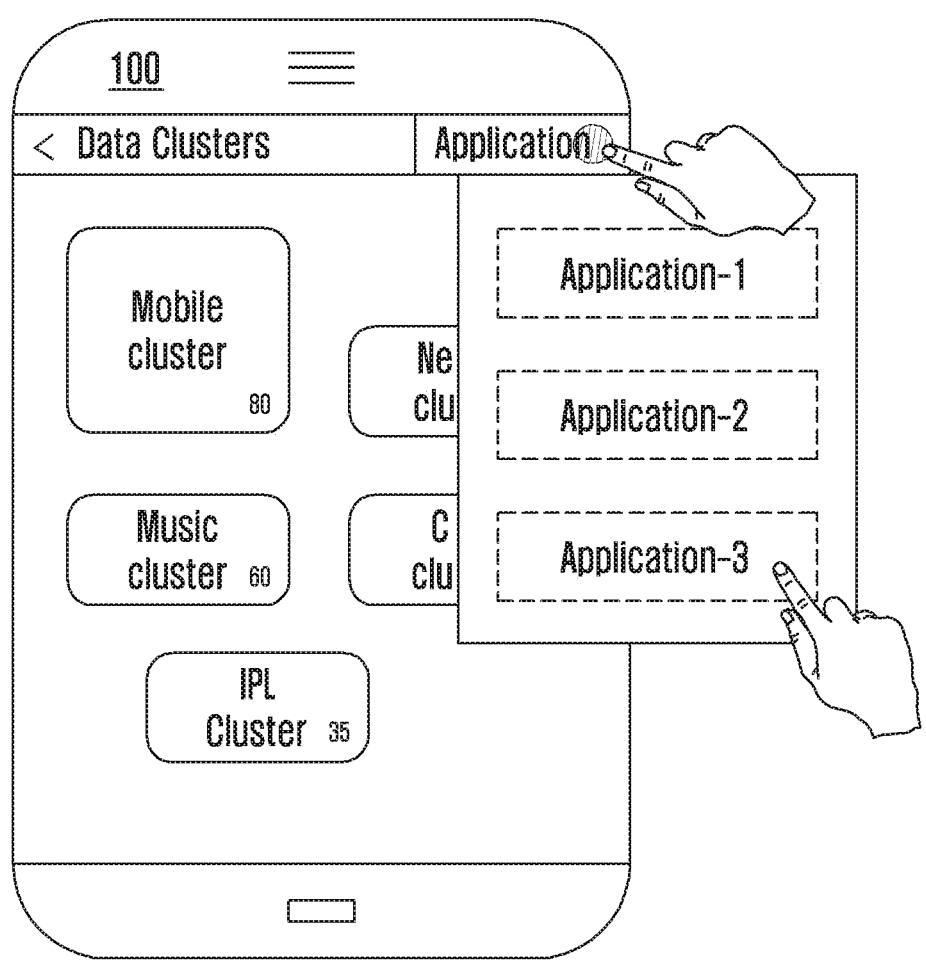
FIGS. 11A to 11C illustrate another example for filtering content available in an application for a received data cluster according to various embodiments of the present disclosure.
Figure 11B:
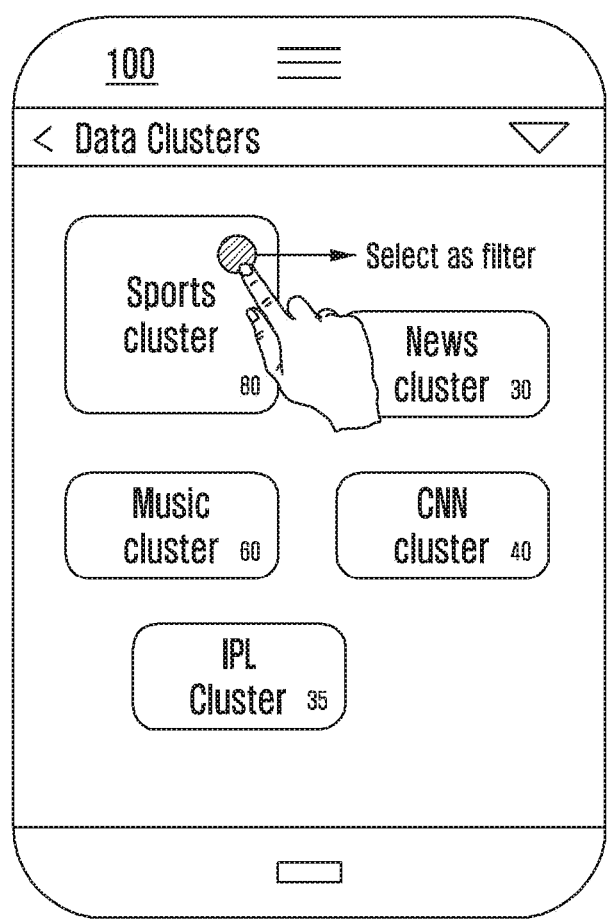
Figure 11C:

FIGS. 11A to 11C illustrate another example for filtering content available in an application for a received data cluster according to various embodiments of the present disclosure.

Referring to FIG. 11A, the electronic device 100 may display at least one data cluster. The electronic device 100 may display at least one object for application display (e.g. application icon) together with the data cluster. In response to user input on the displayed object, the electronic device 100 may display at least one application. For example, the electronic device 100 may display at least one application to which a data cluster is applicable on an overlay screen. The electronic device may then receive a user input for selecting one of the displayed applications. For example, as shown in FIG. 11A, the user may perform a gesture on an application icon to invoke an overlay screen displaying the applications, such as application-1, application-2, and application-3. The user may perform a long press gesture for selecting application-3.

Referring to FIG. 11B, after an application is selected, the electronic device 100 may receive user input for selecting a data cluster to be applied to the selected application. For example, after selecting the application-3, the user may perform a drag and drop gesture to drop the selected application-3 over the mobile data cluster as shown in FIG. 11B.

In an embodiment, when the selected application-3 is dropped over the mobile data cluster, the cluster semantics may be applied to application-3. The semantics of the cluster may determine a search query to be formulated by using a user vector corresponding to the mobile data cluster. For example, the electronic device may search for at least one content matching the user intent for applications by use of a search query.

Referring to FIG. 11C, the electronic device 100 may then display an item corresponding to at least one found content. The formulated search query may be used by application-3 to filter content and display a plurality of items (i.e., search results) which are more specific to the user as shown in FIG. 11C.

Figure 12:
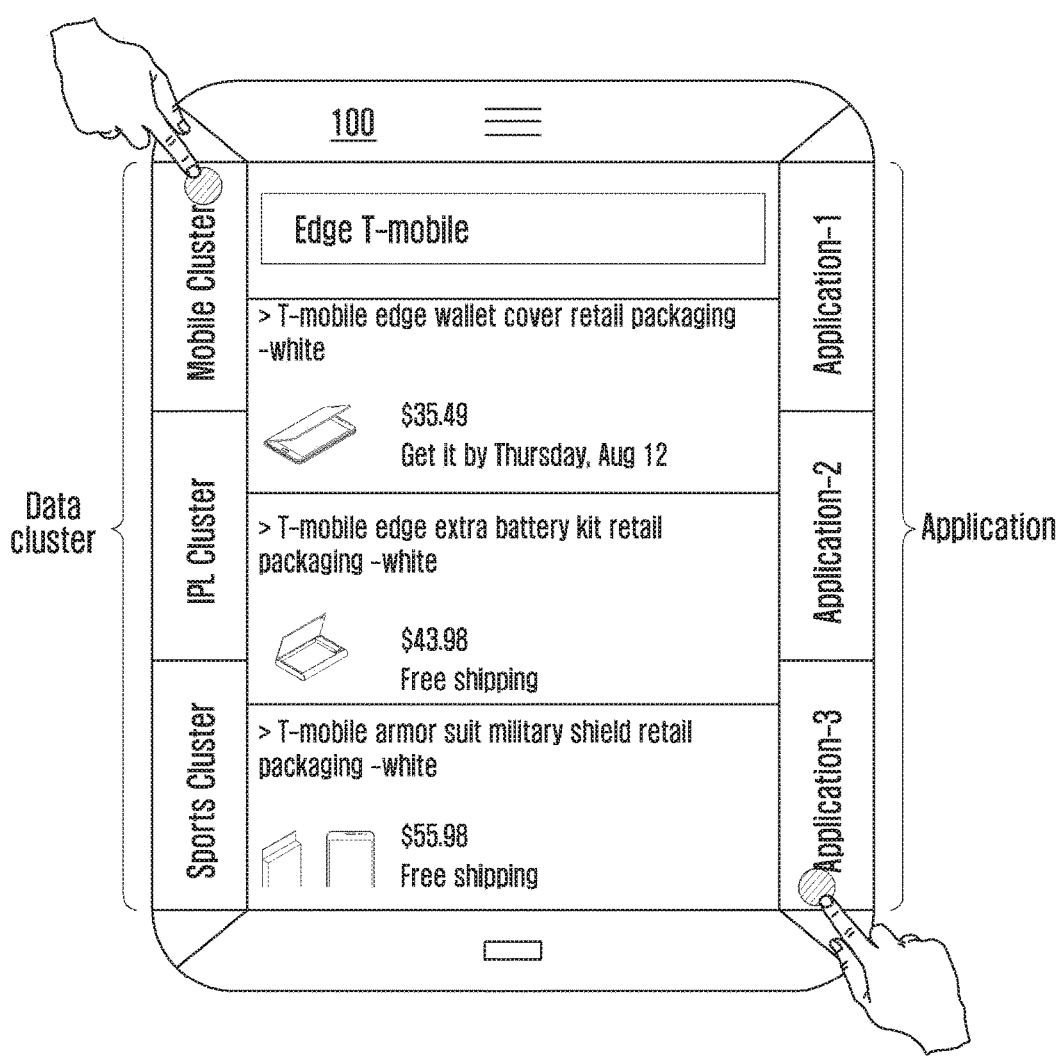
FIG. 12 illustrates another example for filtering content in an electronic device according to various embodiments of the present disclosure.

FIG. 12 illustrates another example for filtering content in an electronic device according to various embodiments of the present disclosure.

Referring to FIG. 12, the electronic device 100 may display data clusters such as a sports data cluster, IPL data cluster, and mobile data cluster on one edge. An application-1, application-2, and application-3 may be displayed on another edge of the electronic device 100 as shown in FIG. 12.

In an embodiment, the user may select a mobile data cluster and application-3 simultaneously to filter the content available in application-3. For example, the cluster semantics may be applied to application-3. The semantics of the cluster may determine a search query to be formulated by using the user vector corresponding to the mobile data cluster. The formulated search query may be used by application-3 to filter content and display a plurality of items (i.e., search results) which are more specific to the user as shown in FIG. 12.

Figure 13:
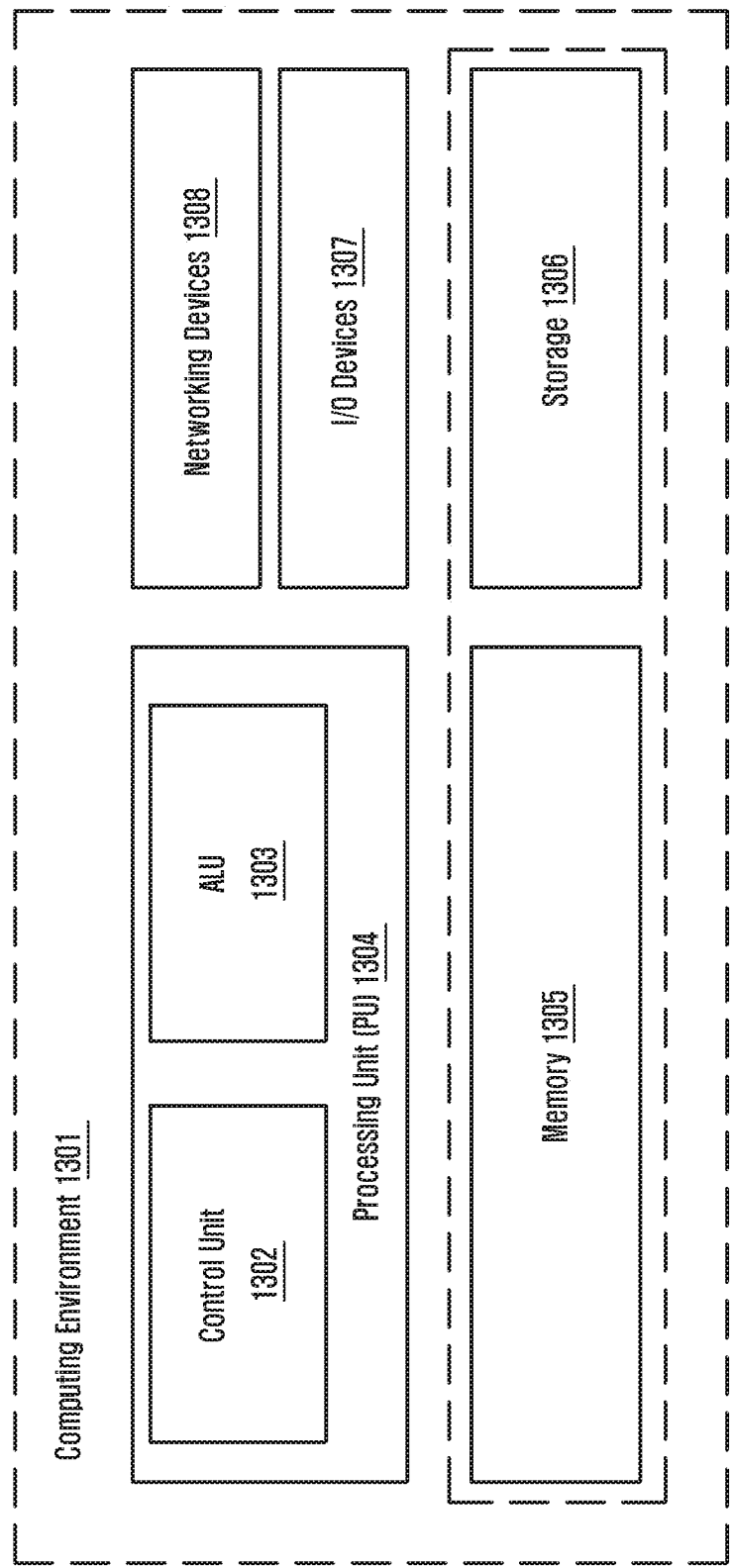
FIG. 13 illustrates a computing environment for implementing a method and system for filtering content in an electronic device according to various embodiments of the present disclosure.

FIG. 13 illustrates a computing environment for implementing a method and system for filtering content in an electronic device according to various embodiments of the present disclosure.

Referring to FIG. 13, a computing environment 1301 comprises at least one processing unit 1304 that is equipped with a control unit 1302 and an arithmetic logic unit (ALU) 1303. The computing environment 1301 further comprises a memory 1305, a storage unit 1306, a plurality of networking devices 1308 and a plurality of input output (I/O) devices 1307. The processing unit 1304 is responsible for processing instructions of an algorithm. The processing unit 1304 receives commands from the control unit 1302 in order to perform such processing as well as other functions an operations as described above. Further, logical and arithmetic operations involved in the execution of the instructions may be computed with the help of the ALU 1303.

The overall computing environment 1301 can be comprised of multiple homogeneous or heterogeneous cores, multiple central processing units (CPUs) of different kinds, special media and other accelerators. The processing unit 1304 is responsible for processing the instructions of the algorithm. Further, a plurality of processing units 1304 may be provided, and located on a single chip or distributed over multiple chips.

The algorithm is comprised of instructions and codes required for the implementation of embodiments of the present disclosure, and may be stored in either the memory unit 1305 or the storage 1306, or a combination thereof. At the time of execution, instructions may be fetched from the corresponding memory 1305 or storage 1306, and executed by the processing unit 1304.

In case of hardware implementations, the various networking devices 1308 or external I/O devices 1307 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1 to 13 include blocks which can be at least one of a hardware device, or a combination of hardware device and software module.

According to various embodiments of the present disclosure, at least part of a device (for example, modules, units or functions thereof) or a method (for example, operations) according to this disclosure, for example, as in a form of a programming module, may be implemented using an instruction stored in non-transitory computer-readable storage media. When at least one processor (for example, the processing unit 1304) executes an instruction, it may perform a function corresponding to the instruction.

The non-transitory computer-readable storage media may include hard disks, floppy disks, magnetic media (for example, magnetic tape), optical media (for example, compact disc read only memory (CD-ROM), and digital versatile disc (DVD)), magneto-optical media (for example, floptical disk), and hardware devices (for example, read only memory (ROM), random access memory (RAM), or flash memory). Additionally, a program instruction may include high-level language code executable by a computer using an interpreter in addition to machine code created by a compiler. The hardware device may be configured to operate as at least one software module to perform an operation of various embodiments and vice versa.

A module or programming module according to various embodiments of the present disclosure may include at least one of the above-mentioned components, may not include some of the above-mentioned components, or may further include another component. Operations performed by a module, programming module, or other components according to various embodiments of the present disclosure may be executed through a sequential, parallel, repetitive or heuristic method. Additionally, some operations may be executed in a different order or may be omitted, and other operations may be added. Moreover, the embodiments disclosed in this specification are suggested for the description and understanding of technical content, but do not limit the range of the present disclosure. Accordingly, the range of the present disclosure should be interpreted as including all modifications or various other embodiments based on the technical idea of the present disclosure.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. An electronic device, comprising:
    a display;
    a communication circuit;
    at least one processor electrically connected with the display and the communication circuit; and
    at least one memory storing one or more computer programs configured to be executed by the at least one processor, the one or more computer programs including instructions to at least:
        determine a plurality of data clusters containing user intent information based on analysis of usage history, the usage history of an application or at least one content, the user intent information comprising a user vector associated with: a topic, an ad-word, a user location, a contextual index or an objective user data collection, wherein the user intent information is not based on a currently inputted user query,
        select the application,
        assign weight to a term word of the user vector,
        assign weight to at least one of the ad-word, the user location, the contextual index or the objective user data collection according to a characteristic or a type of the application,
        display the plurality of data clusters containing the user intent information on the display,
        select a data cluster to be applied to the selected application among the plurality of data clusters according to a user input,
        filter at least one content or service among content and services available in the selected application based on the selected data cluster, and
        display an item corresponding to the at least one filtered content or service on the display.

2. The electronic device of claim 1, wherein the user intent information comprises information regarding user interests and preferences obtained through an analysis of application or content usage histories.

3. The electronic device of claim 1,
    wherein the user intent information is associated with a value to filter the at least one content available in the application, and
    wherein the one or more computer programs further include instructions to dynamically determine or allocate a filtering value based on a type of the application.

4. The electronic device of claim 3,
    wherein the one or more computer programs further include instructions to:
        set a parameter associated with the user intent information according to the user input, and
        dynamically determine or allocate the filtering value based on the parameter, and
    wherein the parameter comprises information on a duration during which to analyze application or content usage histories for the user intent information.

5. The electronic device of claim 1, wherein the selected application comprises at least one of an SMS application, a call log application, a contacts application, or an image application.

6. A method for filtering content in an electronic device, the method comprising:
    determining a plurality of data clusters containing user intent information based on analysis of usage history, the usage history of an application or at least one content, the user intent information comprising a user vector associated with: a topic, an ad-word, a user location, a contextual index or an objective user data collection, wherein the user intent information is not based on a currently inputted user query;
    selecting an application;
    assigning weight to a term word of the user vector;
    assigning weight to at least one of the ad-words, the user location, the contextual index, and the objective user data collection according to a characteristic or a type of the selected application;
    displaying, by the electronic device, the plurality of data clusters containing the user intent information;
    selecting, by the electronic device, a data cluster to be applied to the selected application among the plurality of data clusters according to a user input;
    filtering, by the electronic device, at least one content or service among content and services available in the selected application based on the selected data cluster; and
    displaying, by the electronic device, an item corresponding to the at least one filtered content or service on a display.

7. The method of claim 6, wherein the user intent information comprises information regarding user interests and preferences obtained through an analysis of application or content usage histories.

8. The method of claim 6,
    wherein the user intent information is associated with a value to filter the at least one content available in the application, and wherein the method further comprises dynamically determining or allocating, by the electronic device, a filtering value based on a type of the application.

9. The method of claim 8, further comprising:
setting, by the electronic device, a parameter associated with the user intent information according to the user input, and
dynamically determining or allocating, by the electronic device, the filtering value based on the parameter,
wherein the parameter comprises information on a duration during which to analyze application or content usage histories for the user intent information.

10. An electronic device, comprising:
a display;
a communication circuit;
at least one processor electrically connected with the display and the communication circuit; and
at least one memory storing one or more computer programs configured to be executed by the at least one processor, the one or more computer programs including instructions to at least:
select an application and a data cluster to be applied to the selected application among a plurality of data clusters containing user intent information according to user input, the user intent information comprising at least one of a user vector associated with: a topic, ad-words, a user location, a contextual index, or an objective user data collection, wherein the user intent information is not based on a currently inputted user query,
send the selected data cluster through the communication circuit to an external server,
receive information on content filtered among content and services available in the selected application by the external server based on the selected data cluster through the communication circuit from the external server, and
display at least one content filtered with respect to the selected data cluster on the display by use of the information received from the external server,
wherein a term word of the user vector is weighted, and
wherein at least one of the ad-words, the user location, the contextual index, or the objective user data collection is weighted according to a characteristic or a type of the selected application for filtering the content.

11. The electronic device of claim 10, wherein the information on the filtered content comprises webpage or uniform resource locator (URL) information for the filtered content.

12. A method for filtering content in an electronic device, the method comprising:
selecting, by the electronic device, an application and a data cluster to be applied to the selected application among a plurality of data clusters containing user intent information according to user input, the user intent information comprising at least one of: a user vector associated with a topic, ad-words, a user location, a contextual index, or an objective user data collection, wherein the user intent information is not based on a currently inputted user query;
sending, by the electronic device, the selected data cluster to an external server;
receiving, by the electronic device, information on content filtered among content and services available in the selected application by the external server based on the selected data cluster from the external server; and
displaying, by the electronic device, at least one content filtered with respect to the selected data cluster by use of the information received from the external server,
wherein a term word of the user vector is weighted, and
wherein at least one of the ad-words, the user location, the contextual index, or the objective user data collection are weighted according to a characteristic or a type of the selected application for filtering the content.

13. The method of claim 12, wherein the information on the filtered content comprises webpage or uniform resource locator (URL) information for the filtered content.

14. A server, comprising:
a communication circuit; and
at least one processor electrically connected with the communication circuit; and
at least one memory storing one or more computer programs configured to be executed by the at least one processor, the one or more computer programs including instructions to at least:
receive a data cluster containing user intent information through the communication circuit from an external electronic device, the user intent information comprising at least one of: a user vector associated with a topic, ad-words, a user location, a contextual index, or an objective user data collection, wherein the user intent information is not based on a currently inputted user query,
filter content among content and services available in an application selected by a user in the external electronic device based on the received data cluster, and
send information on the filtered content through the communication circuit to the external electronic device,
wherein the server assign a weight to a term word of the user vector, and
wherein the server assigns a weight to at least one of the ad-words, the user location, the contextual index, or the objective user data collection according to a characteristic or a type of the selected application for filtering the content.

15. The server of claim 14, wherein the information on the filtered content comprises webpage or uniform resource locator (URL) information for the filtered content.

16. A method for filtering content in a server, the method comprising:
receiving, by the server, a data cluster containing user intent information from an external electronic device, the user intent information comprising at least one of: a user vector associated with a topic, ad-words, a user location, a contextual index, or an objective user data collection, wherein the user intent information is not based on a currently inputted user query;
filtering, by the server, content among content and services available in an application selected by a user in the external electronic device based on the received data cluster; and
sending, by the server, information on the filtered content to the external electronic device,
wherein the server assign weight to a term word of the user vector, and
wherein the server assign a weight to at least one of the ad-words, the user location, the contextual index, or the objective user data collection according to a characteristic or a type of the selected application for filtering the content.

17. The method of claim 16, wherein the information on the filtered content comprises webpage or uniform resource locator (URL) information for the filtered content.

* * * * *